(No Model.)

F. E. KOHLER.
HORSE HAY RAKE.

No. 269,430. Patented Dec. 19, 1882.

Witnesses:
H. N. Low
J. S. Barker

Inventor:
Frederick E. Kohler
by Doubleday & Bliss
attys.

UNITED STATES PATENT OFFICE.

FREDERICK E. KOHLER, OF CANTON, OHIO, ASSIGNOR OF ONE-HALF TO ISAAC HARTER, OF SAME PLACE.

HORSE HAY-RAKE.

SPECIFICATION forming part of Letters Patent No. 269,430, dated December 19, 1882.

Application filed April 22, 1882. (No model.)

*To all whom it may concern:*

Be it known that I, FREDERICK E. KOHLER, a citizen of the United States, residing at Canton, in the county of Stark and State of Ohio, have invented certain new and useful Improvements in Horse Hay-Rakes, of which the following is a specification, reference being had therein to the accompanying drawings.

This invention relates to an improvement in horse-rakes, the object being to provide an adjusting-stop immediately below the heel of the lever which elevates the teeth, whereby several adjustments can be provided for the throw of the lever without disconnecting any of the parts of the rake from the others.

Figure 1:
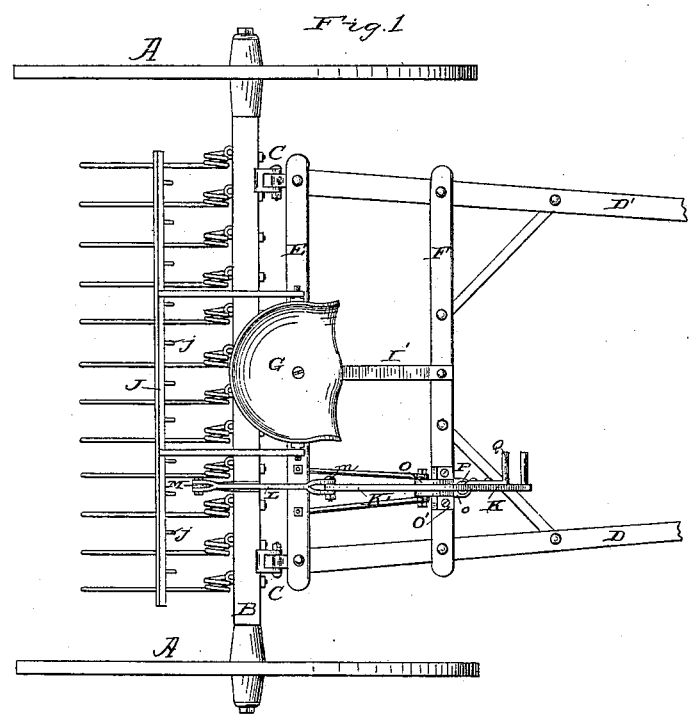
Figure 2:
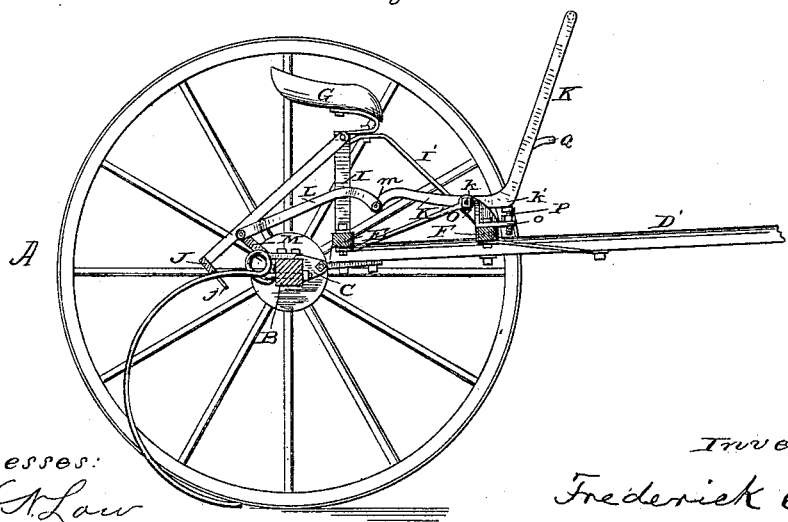

Figure 1 is a top plan view of a rake having my improvement applied thereto. Fig. 2 is a cross-section, Fig. 1.

In the drawings, A A represent driving-wheels, upon which the rake is mounted.

B is the axle, which in this construction also is made to serve as the rake-head, the teeth being attached at their heels or inner ends to it. The draft-frame is attached to the head or axle by hinge-couplings at C C, the frame consisting preferably of the draft-pieces D D', a rear cross-piece, E, and a forward cross-piece, F. On the draft-frame the driver's seat G is supported by means of braces I I'.

J represents the clearer, having teeth *j*, and being arranged to swing from a point immediately below the driver's seat.

The rake-teeth are thrown up from the ground by the operator by means of a lever, K K', pivoted at *k* in front of the driver's seat, a link, L, and an arm, M, the link L being pivoted at one end to the said arm M and at the other to the arm K' of the lever. The pivot which connects the arm K' and the link L is adjustable, so that the throw of the teeth can be varied as occasion requires. The pivot *k* of the operating-lever is connected to a metal bracket having lugs or ears O O, a base-plate, O', and a forwardly-projecting plate, *o*. Through the forwardly-projecting plate *o* an adjustable stop, P, is inserted. I have shown in the drawings that form of stop which I prefer, it consisting of a short screw-threaded rod engaging with a thread in the plate *o*. It is situated in the plane in which the lever K K' swings or oscillates, and is adapted to have the shoulder *k'* on the lever strike against its head or upper end. It will be seen that if the lever K K' can be swung forward far enough the pivot *m*, connecting link L and arm K', will be thrown so high as to lock the teeth in their lowest position, where they will be held rigidly until said pivot *m* is again brought down, which is effected by the operator by pulling the upper end of arm K backward; and it will also be seen that the rigidity of the locking which can be thus effected will be varied according to the height at which said pivot *m* is thrown. When the pivot is but little above the line between the pivot *m* and the pivot *k* the rigidity is less than when it is considerably above said line. Therefore if the stop P be thrown up far enough to prevent the arm K from being thrown forward enough to bring the pivot *m* above said line, the teeth cannot be permanently locked in position. If the stop P be in such position as to permit the pivot *m* to be a little above the line, the parts will be slightly locked. If the stop be put at its lowest point, the lever K K' can be thrown forward so that the teeth can be locked.

Q is a foot-treadle projecting laterally from the side of the lever, by means of which the operator can hold the rake-teeth down when the stop is so adjusted that they cannot be locked upon the ground.

I am aware that use has been heretofore made of a metal block adapted to be swung or moved under the heel end of the lever to prevent the teeth from being locked on the ground; but a block of the character alluded to cannot be used, as can the adjustable stop which I have devised, to vary the tension or rigidity of the lock. The block provides but one point of stoppage, whereas it is desirable to not only permit a tight or a rigid locking and also a loose holding of the teeth, but, in addition to these, a variable rigidity between the two extremes.

I am also aware that use has been made of a slotted plate and set-screw at the rear end of the bent lever to connect it with the link behind it, and I do not claim such construction as my invention; but in using devices of the character last referred to it is necessary to disconnect two or more of the parts in order to make the required adjustment, whereas in mine no such operation is necessary, all that is required being for the operator to lean forward and turn the set-screw up or down in its bearing sufficiently far. Moreover, with the adjusting devices which I have provided I combine a foot-treadle attached to the hand-lever, so that I furnish the operator a wide range of capability in the matter of locking or holding the teeth down. If the stop be arranged to prevent a rigid locking, the operator can, under ordinary circumstances, hold the teeth firmly to their work by means of his foot; but if a stronger holding is necessary he can assist the pressure of his foot by throwing the pivot high enough to lock the teeth down.

What I claim is—

In a horse hay-rake, the combination, with the head B, link L, pivoted to said head, and bent operating-lever K K', pivoted to said link and forming a toggle therewith, of the supporting-bracket O O' o, formed in one piece and provided with the adjustable set-screw P, mounted therein in line with the arm of the operating-lever, whereby a pivotal bearing is formed for the operating-lever and the play of the toggle-levers regulated, substantially as set forth.

In testimony whereof I affix my signature in presence of two witnesses.

FREDERICK E. KOHLER.

Witnesses:
O. A. ESSIG,
JOHN C. WELTY.